Aug. 20, 1946.    W. T. STEPHENS    2,406,173
SERVOMOTOR AND CONTROL THEREOF
Filed April 16, 1943    4 Sheets-Sheet 3
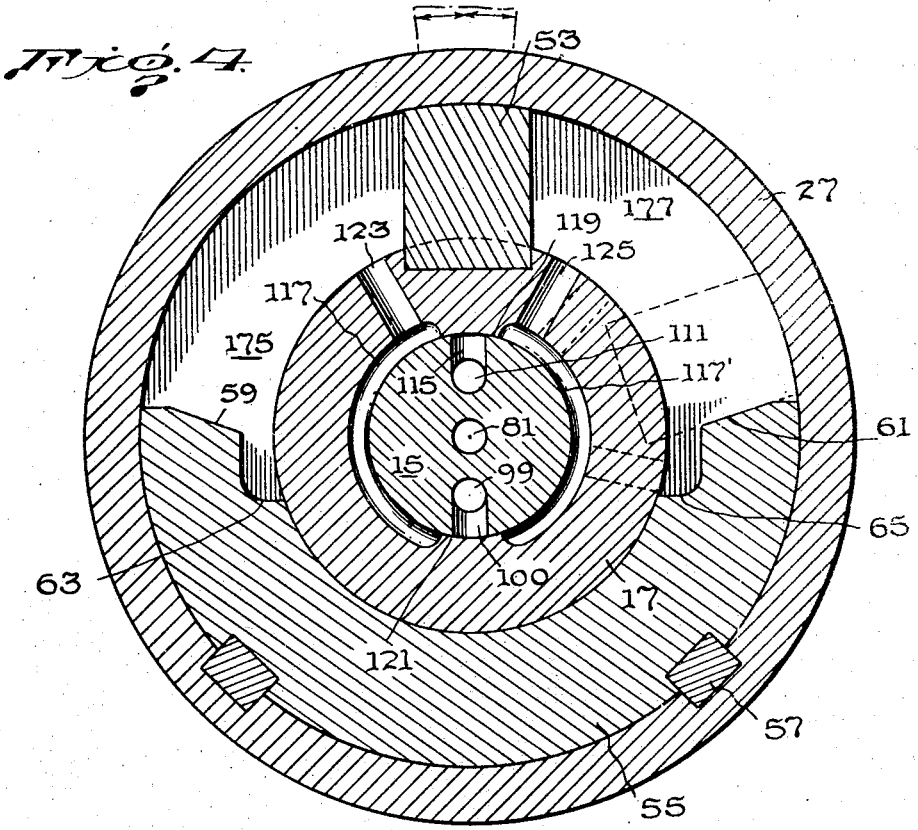
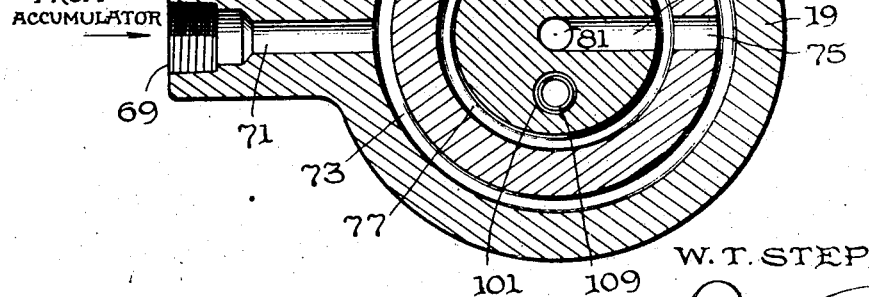
Inventor
W. T. STEPHENS

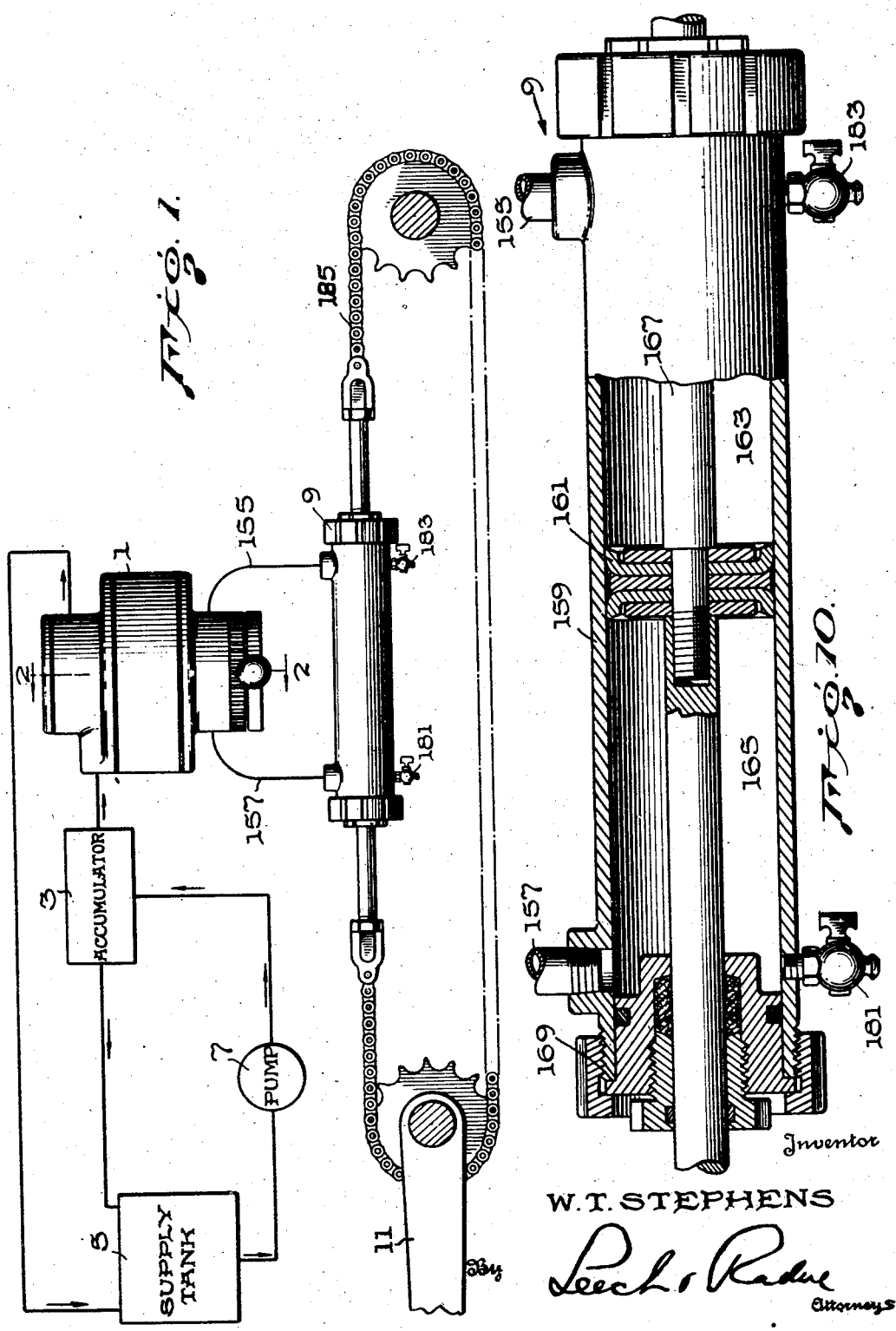

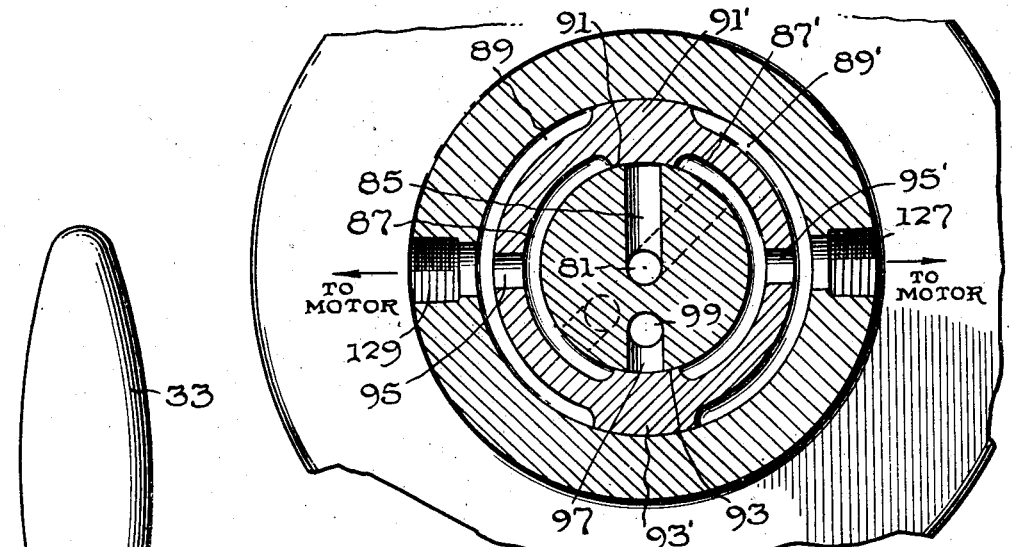
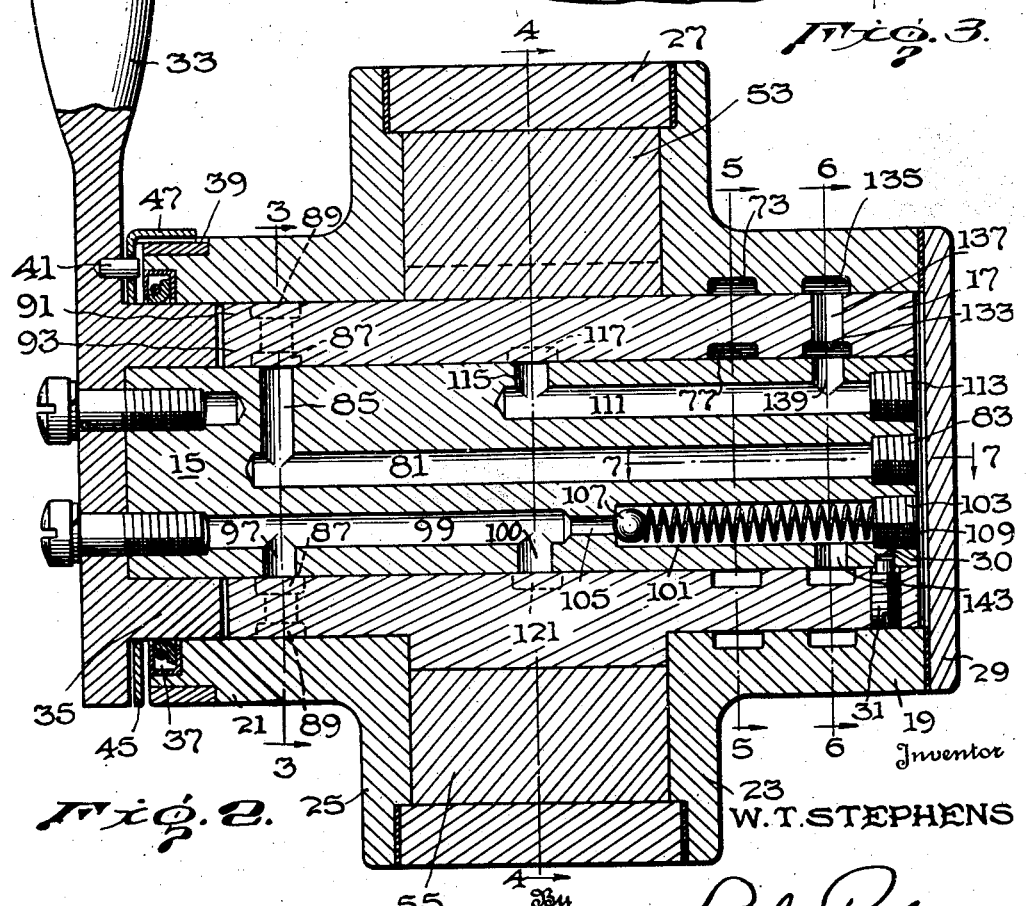

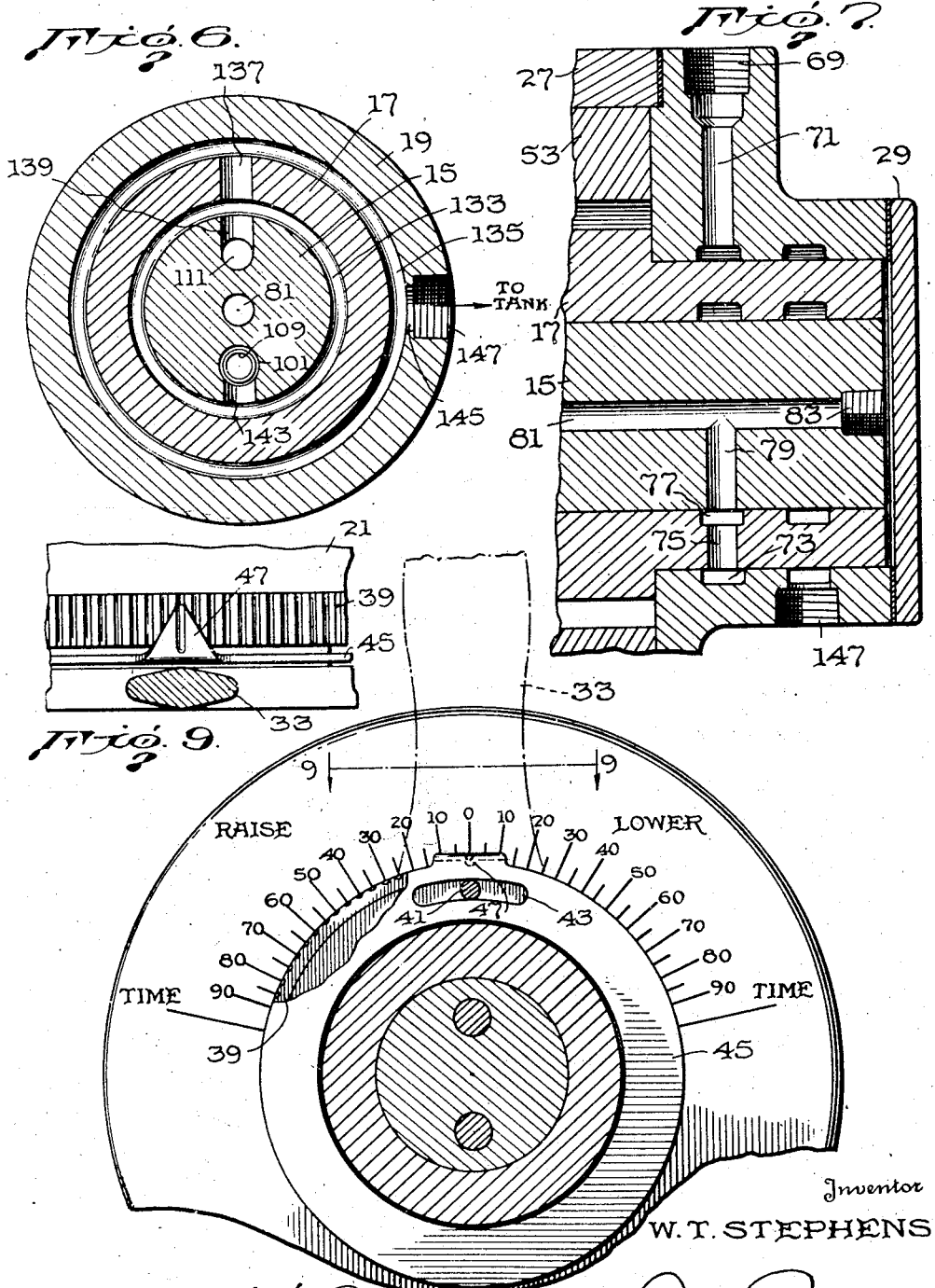

Patented Aug. 20, 1946

2,406,173

UNITED STATES PATENT OFFICE 2,406,173

SERVOMOTOR AND CONTROL THEREOF

William T. Stephens, Cleveland, Ohio, assignor to Hydraulic Control Engineering Company, Cleveland, Ohio, a corporation of Ohio Application April 16, 1943, Serial No. 483,312

13 Claims. (Cl. 121—41)

This invention relates to a hydraulic control system, and more particularly to a hydraulic system and control valve therefor, especially for operating a pivoted control member such as an aircraft aileron, rudder and wing flap, or a vehicle steering gear.

An object of the invention is to provide a hydraulic control apparatus whereby the movement of the pivoted member is positive in operation without hunting or over control. The hydraulic hoist or motor used for actuating the pivoted member is of the double acting variety wherein hydraulic fluid under pressure is introduced behind one side of the double acting piston and the hydraulic fluid on the other side of the piston is exhausted therethrough into a valve mechanism provided with compartments or chambers of the identical volumetric capacity as the portions of the motor cylinder on either side of the double acting piston.

Another object of the invention is the construction of the control valve whereby hydraulic fluid is applied to either side of the hydraulic motor to move the piston rod thereof to any desired degree and to maintain this fixed position with assurity until the operator desires to change the setting thereof. It will be appreciated by those in the art that it is essential that a pivoted control surface of an aircraft must be moved an exact amount so that there is no over or under movement of the pivoted member and that any tendency of the pivoted member to flutter must be suppressed.

In the drawings:

Fig. 1 is a diagrammatic lay-out of the system, including the control valve, the hydraulic double acting motor and the typical means of moving the pivoted member;

Fig. 2 is a longitudinal, vertical, cross-sectional view of the control valve per se, taken on line 2—2 of Fig. 1 and showing the various fluid passages therethrough and the operating handle whereby these passages are brought into desired cooperative relation;

Fig. 3 is a transverse vertical section taken on line 3—3 of Fig. 2;

Fig. 4 is a transverse vertical section taken on line 4—4 of Fig. 2;

Fig. 5 is a transverse vertical section taken on line 5—5 of Fig. 2;

Fig. 6 is a transverse vertical section taken on line 6—6 of Fig. 2;

Fig. 7 is a horizontal cross-sectional view taken on line 7—7 of Fig. 2 at the rear portion of the valve;

Fig. 8 is a fragmentary front elevation of the control valve illustrating the operating handle therefor and a degree dial for indicating the position of the valves;

Fig. 9 is a fragmentary view partially in cross-section taken on line 9—9 of Fig. 8; and Fig. 10 illustrates the double acting hydraulic motor partially broken away to show the piston and piston rod construction.

Fig. 1 illustrates a diagrammatic lay-out of the system as a whole, showing one manner of operating the pivoted aileron or other pivoted surface. In this figure numeral 1 denotes the hydraulic control valve coupled by suitable pressure lines to a fluid accumulator 3, hydraulic fluid supply tank 5 and pressure pump 7 for maintaining the hydraulic fluid at a pressure sufficient to operate the fluid motor 9. As shown in the drawings, the hydraulic motor 9 may be coupled through a chain 185 or other power transmitting medium to sprocket wheels, one of which has a shaft on which the aileron or other surface 11 is secured.

In addition to the novelty of the system for controlling or moving a pivoted surface, the invention hereinafter described includes the hydraulic control per se designated by numeral 1.

The control valve as shown in Fig. 2 consists of a center rotatable valve plug 15 mounted within a cylindrical rotor 17. The rotor is supported in spaced cylindrical bearings 19 and 21 having enlarged spaced annular flanges 23 and 25 respectively. These enlarged flange members are peripherally jointed by an enlarged cylindrical casing 27. The rear end of the valve defined by the cylinder bearing 19 is closed by a gasketed end plate 29 while the rotor 17 is secured in the valve assembly by means of a set screw 31 whose inner end rides within an annular groove 30 formed adjacent the end of the valve plug 15.

Rotative movement is imparted to the inner valve plug 15 by means of a vertically extending handle 33 having an annular inwardly extending flange 35. The outer periphery of this flange is supported within the outer end of the left hand cylindrical bearing 21 with an annular seal 37 abutting the flange 35 for the purpose of forming a hydraulic seal. As shown, the lower portion of the handle 33 carrying the inwardly extending flange is bolted to the rotary plug 15. Lying between the outer end of the cylindrical bearing 21 and the flat portion of the handle and surrounding the flange 35 is a dial plate 45 having an arcuate slot 43 therein to provide a lost motion connection, as will be hereinafter described. The dial plate 45 is loosely mounted on the outer surface of flange 35. Pin 41 affixed to the inner surface of the handle 33 extends into the arcuate slot 43 of dial plate 45. Directly above the arcuate slot the dial plate is turned at right angles to form a tapered pointer 47 having a groove or guide line therein for registering with suitable indicia carried by the dial ring 39.

As shown in detail in Figs. 2 and 4, the central portion of the control valve lying between the enlarged flanges 23 and 25 is provided with a lower cylindrical filler segment 55 that is held in fixed relation with the cylindrical casing 27 by means of keys 57. The enlarged central part of the rotor 17 is supported by and has a close fit with this cylindrical segment 55. The rotor also carries a baffle or abutment 53 keyed therein and dividing the upper open chamber between the side edges or stops 59 and 61 of the cylindrical segment 55. When the rotor 17 is rotated to the right or left its movement is arrested by the edges 59 and 61. The member 55 is provided with longitudinal fluid grooves 63 and 65 adjacent the rotor 17 and formed below the oblique stop surfaces 59 and 61. Hydraulic fluid from the accumulator 3 enters the control valve through inlet 69 (Fig. 3) having a horizontal passage 71 passing through the bearing wall 19 to an annular groove 73 also formed in the cylindrical bearing 19. When the control valve is in any position the annular groove 73 permits fluid to pass through radial passage 75 in the rotor 17 and thence to circumferential groove 77 formed in the rotor and thus circulate to radial passage 79 formed through the valve plug 15 leading to a central longitudinal bore 81. The longitudinal bore 81 is blocked at the rear of the valve by a screw plug 83 while the forward end of the bore leads to radial passage 85 (Fig. 3) which is normally blocked by land 91, which is formed on the rotor 17 between the upper ends of the semi-circumferential grooves 87 and 87'. The lower spaced ends of these semi-circumferential grooves are supported by land 93. These semi-circular grooves 87 and 87' open into radial passages 95 and 95' leading to a second set of semi-circumferential grooves 89 and 89' formed on the outer periphery of the rotor 17. The upper and lower ends of these grooves 89 and 89' terminate on opposite sides of lands 91' and 93' respectively. Ports 129 and 127 join grooves 89 and 89' respectively with the outside of bearing 21 and thus allow for fluid connections to the motor chambers 165 and 163, respectively, by means of fluid lines 157 and 155.

In addition to the bore 81 the valve plug 15 houses longitudinal bores 99, 101, 105 and 111. One end of the bore 99 is screwthreaded to receive one of the holding screws for securing the operating handle 33 to the valve plug 15 with the opposite end of the bore 99 terminating in a reduced diameter bore portion 105 which in turn communicates with an enlarged diameter bore 101. The bore 101 is plugged at its outer end by screw plug 103 and also houses check valve 107 and its associated spring 109 which normally presses the check ball 107 into engagement with the end of reduced diameter bore portion 105. This check ball 107 is set to open at a pressure in excess of that needed for operation of the controls although this pressure is somewhat less than the accumulator pressure.

The radial passage 97 joining bore 99 with the outside of the valve plug 15 is in the same plane and spaced diametrically opposite from the radial passage 85 communicating with bore 81.

The radial passages 100 and 115 which lie in spaced, parallel relationship to passages 85 and 97 are also diametrically opposite and join bores 99 and 111, respectively, to the outside of the valve plug 15. Radial passages 139 and 143 lying in spaced parallel relationship to passages 85 and 97 and 100 and 115 are also positioned diametrically opposite to each other and join bores 111 and 101, respectively, to the outside of the valve plug 15. Bore 111 is plugged at its outer end by screw plug 113. This series of bores and passages together with the previously described bore 81 and its associated passages 79 and 85 make up the fluid passages through the valve plug 15.

In rotor 17 lands 119 and 121 (Fig. 4) separate the ends of the circumferential grooves 117 and 117' and normally block passages 115 and 100, respectively. The fluid passages 123 and 125 communicate with grooves 117 and 117' and chambers 175 and 177, respectively, of the valve motor.

Passages 139 and 143, Fig. 6, of the plug 15 register with the annular groove 133 of rotor 17 and passage 137 joins this groove with the outside of rotor 17 and is in communication with the annular groove 135 formed in the bearing 19. Passage 145 leading from groove 135 through the wall of the bearing 19 terminates in a threaded port 147 for connection through suitable piping with fluid supply tank 5. The grooves 87, 87'; 89, 89'; 117, 117', 77 and 133 together with passages 95, 95', 123, 125, 75 and 137 form the fluid circulating means through the rotor 17. Grooves 73 and 135 together with passages 71 and 145 and ports 69 and 147 are the fluid circulating means through the outer bearing 19.

The operating motor 9 is of the double acting type and consists of an outer casing 159 which houses reciprocating piston 161 fastened to oppositely extending piston rods 167 passing through the outer removable ends 169 fastened securely to the casing 159. The piston 161 divides the motor 9 into two chambers 163 and 165 whose combined volume is equal to the combined volume of the chambers 175 and 177 of the valve motor. These valve motor chambers 175 and 177 are so constructed that when one of the chambers is expanded or enlarged by movement of plug 15 it causes the other chamber to be contracted a similar amount. Operating motor chambers 165 and 163 are similarly constructed.

In operation the valve plug 15 is manually rotated to allow passage of high pressure fluid to one side of the motor 9 and the exhaust fluid from the other side of the motor piston is utilized to move the rotor 17 to close off the flow of fluid. Because of the volumetric equality between the valve motor and the operating motor and the relationship of the chambers in each of these motors it will be evident that the introduction of fluid into one side of the motor 9 causes the introduction of an equal amount of fluid into the valve motor to cause rotation of the rotor 17. By knowing the total displacement of the motor 9 and the amount of angular movement of both surface 11 and rotor 17 as a result of such displacement it is a comparatively simple matter to calibrate the angular movement of the surface 11 in relation to the angular movement of the rotor 17 and thus determine the marking of dial ring 39.

Due to the construction of valve plug 15 and rotor 17 as shown in sections 3—3 of Figures 2 and 3, it will be appreciated that when plug 15 is rotated, some fixed angular amount of high pressure fluid will flow to one side of motor 9 until the exhaust fluid from the opposite side thereof will cause rotor 17 (Fig. 4) to move a sufficient amount to close off the high pressure fluid flow. Since both plug 15 and rotor 17 have a common center of rotation it is apparent that rotating valve plug 15 a given angular amount will produce a similar angular movement of rotor 17 if passages 85 and 87 are of the same width as lands 91 and 93. However, since these lands are wider for sealing purposes than the passages, plug 15 must be rotated an additional amount to provide for the necessary over travel. This is compensated for in the indicator by means of pin 41 and slot 43 and the amount of angular movement of surface 11 can be determined directly by means of the setting of pointer 47 on dial ring 39 when the valve plug is rotated. However, this is true only if the valve motor and operating means are in synchronism and the method of obtaining this synchronized relationship will be explained in detail hereafter.

It will be noted that passages 85, 97, 100 and 115 are all in the same longitudinal plane and are of substantially the same width. Similarly lands 91, 93, 119 and 121 are in the same plane of rotor 17 and are of substantially the same magnitude, hence any movement of the valve plug 15 which will uncover one of these passages from its land seal will simultaneously uncover the other of said passages and conversely any movement of rotor 17 which causes a land to cover and seal one of these passages will cause all of them to be sealed.

Inasmuch as the flow of fluid through the valve is simultaneously in several directions and at several levels attention is particularly directed to the cross-sectional views illustrated in Figs. 3, 4, 5, 6 and 7. Fig. 5 is the entrance level where the high pressure fluid from the accumulator enters the valve assembly 1. Fig. 3 is the valve level where the high pressure fluid flow to the operating motor 9 is controlled together with the return flow from the motor. Fig. 4 is the valve motor level where the flow of exhaust fluid from motor 9 to the valve motor is controlled and also the return flow from the valve motor back to the supply tank 5. Fig. 6 as supplemented by Fig. 7 shows the return level which includes the exit port for fluid leaving the valve and returning to the supply tank.

When it is desired to lower the aileron or other control surface to any desired degrees as, for instance 45°, the control lever 33 is rotated to the right until the pointer 47 registers with the 45° mark on the scale. It will be noted that the pin 41 carried by the operating lever of handle 33 does not connect with or pick up the plate 45 carrying the pointer 47 until the valve plug 15 fastened to the lever 33 has moved through the distance of the slot 43 so that the pointer does not start to register on the scale until the valve plug 15 has moved sufficiently to bring the fluid passage 85 into communication with passage 87' thereby taking up the lap or overtravel. With the pointer 47 and valve plug 15 rotated to coincide with the 45° scale marking the high pressure hydraulic fluid will then flow from the accumulator 3 to the passage 85 as above described and continue to the motor 9 by way of passages 87', 95', 89', port 127 and conduit 155 to the right hand chamber 163 of the motor where the fluid will force the double acting piston 161 to the left thus lowering the surface 11.

Inasmuch as the motor and system are filled with fluid, the oil exhausted from left hand chamber 165 will be forced through conduit 157 through port 129 and passages 89, 95, 87, 97, 99, 100, 117 and 123 to the left hand rotor chamber 175. The fluid thereupon rotates the rotor 17 and abutment 53 to the right. The exhaust oil from right hand chamber 177 then passes back to the supply pipe via passages 125, 117', 115, 111, 139, 133, 137, 135, 145 and port 147. The rotor 17 will thereupon turn to the right until the fluid passage 85 is again blocked by the land 91. When this occurs, hydraulic fluid cannot longer flow to the motor and consequently movement thereof is arrested. At the time passage 97 is blocked by land 93, passage 115 is blocked by land 119 and passage 100 by land 121 so that all flow of fluid to and from the hydraulic motor ceases and as the rotor 17 is stopped the system comes to rest with the aileron or other control surface depressed to 45° from its horizontal position.

To return the control surface to its original position handle 3³ is moved to the left. The initial movement in this direction takes up the overtravel of valve plunger 15 and after this has occurred passage 85 is put to communication with passage 87. At this point the pin 41 abuts the end of the arcuate slot 43 in the plate 45 and thus the plate 45 is picked up and thereafter moves with the lever 33 until the plate and its associated pointer indicates zero on the scale plate. Fluid pressure is still available at the ends of passages 81—85 as previously described and will flow to the left hand motor chamber 165 by way of passages 87, 95 and 89, port 129 and conduit 157 thereupon forcing motor piston 161 toward the right to raise the aileron. Exhaust oil from the right hand chamber 163 is forced into the right hand rotor chamber 177 by way of line 155, port 127 and passages 89', 95', 87', 97, 99, 100, 117' and 125 whereupon rotor 17 and the abutment 53 are moved to the left. Exhaust oil from the left hand chamber 175 of the rotor is pushed back to the supply tank 5 via passages 123, 117, 115, 111, 139, 133, 137 and 135 to port 147. Movement of the rotor 17 will thus continue to the left until the passages 85, 97, 100 and 115 are closed or blocked by lands 91, 93, 121 and 119 respectively, thus arresting any further flow of fluid.

When this condition has been effected rotor 17 and motor piston 161 will be in their neutral or mid positions whereupon if the handle 33 is now moved to the right until the pin 41 bisects the center line of slot 43 in plate 45 the respective positions of the valve and system will be in identical position to that assumed at the start of the control operation. This last movement to the right of lever 33 will produce no movement of either the piston 161 or rotor 17 as it merely reestablishes the valve plunger 15 to its original starting position with the passages 85 and 97 centered on lands 91 and 93 respectively.

While this latter position of the valve plunger 15 contributes nothing to the operation or movement of the aileron while the aircraft is in flight, it does provide a positive means of sealing the hydraulic fluid in the system when the aircraft is on the ground and the pump 7 is not in operation. The overtravel or lap provided by lands 91, 93, 119 and also 121 prevents flutter of the aileron when the ship is in flight by allowing overtravel of the rotor 17 when coming up to the stop position. The lands being wider than the diameter of the passages they block, prevents the slight overtravel of the rotor 17 from producing a reversal of flow of the hydraulic liquid and thus the flutter condition caused by such reversal is eliminated and a dangerous and undesirable condition avoided.

To raise the aileron above its horizontal position the pointer plate 45 and pointer 47 are moved to the left through the medium of the handle 33 to the desired degree of elevation as indicated on the scale 39. High pressure fluid thereupon flows from passage 85 through passages 87, 95, and 89, port 129 and conduit 157 to the left hand motor chamber 165 and forces piston 161 to the right thus elevating the aileron. Exhaust oil from chamber 163 is moved by the operation of the piston through line 155, port 127, passages 89', 95', 87', 97, 99, 100, 117' and 125 to right hand rotor chamber 177 whereby the rotor 17 and its abutment 53 are rotated to the left. Exhaust fluid from chamber 175 is forced back into the supply tank 5 by way of passages 123, 117, 115, 111, 139, 133, 137, 135 and 145 to port 147. The motion of the rotor 17 is arrested when it catches up with valve plunger 15 and lands 91, 93, 119 and 121 block the flow of oil from passages 85, 97, 115 and 100 respectively.

Since the fluid circuit just described is identical to the circuit necessary to raise the aileron or other control surface from its lower or depressed position back to its horizontal or neutral position, it is evident that to raise the aileron, the handle 33 must be moved to the left and to lower the handle must be moved to the right. The position that the aileron will assume when it comes to rest can always be accurately determined by observation of the position of the pointer 47 registering on the scale plate 39.

Before taking off for a flight or putting the system into operation it is essential that the operator be sure that the control apparatus is in time as occasionally the motor piston 161 is not precisely synchronized with the rotor 17. To ascertain if the motor and control valve are in proper timed relation the operating lever 33 should always be moved to both the right and left extreme positions. If it is found that the piston 161 and the rotor 17 are not in timed relation, the movement of the lever to the extreme right and left positions two or three times will retime or synchronize the apparatus in the following manner. Assuming that the piston 161 has moved to the right without a corresponding movement of the rotor 17, then, if lever 33 is pushed all the way over toward the left until the pointer 47 registers with the "time" position on the scale 39, hydraulic fluid will flow from the accumulator 3 to the left-hand chamber 165, forcing piston 161 to the right, and moving fluid from chamber 165 into valve chamber 177, while the fluid from chamber 175 is forced back to the supply tank 5. Since motor piston 161 is out of time but, being ahead of the rotor 17, when moving toward the right, the piston will reach the end of its travel without having displaced sufficient fluid to push rotor abutment 53 to its left-hand stop 59 on part 55 and, thus, the rotor 17 will still be out of time with the piston 161. If the lever 33 is now pulled over toward the right until the pointer 47 lines up with the right timing position on the scale, fluid will then flow from the accumulator 3 to right-hand motor chamber 163, forcing piston 161 to the left and moving the exhausted fluid to left-hand valve chamber 175. Rotor 17 now leads the piston 161 and the abutment 53 will come to its stop 61 on part 55 before the piston 61 reaches the end of the motor cylinder. With the pointer 47 set at the timing mark rotor 17 will come to rest against part 55 without closing off passages 85, 97, 100 or 115 and fluid will continue to flow to the chamber 163 and, also, to chamber 175. However, if the chamber 175 is filled with fluid the pressure thereof in passage 99 will be sufficient to lift the check ball 107 from its seat and the fluid released will flow back to the supply tank 5 by way of passages 105, 101, 143, 133, 137, 135, 145 and port 147 until the motor piston 161 reaches the end of its stroke, thus cutting off the supply of fluid going to passage 99. Since both motor piston 161 and rotor 17 are now at their extreme positions they are again in time and any movement of piston 161 will produce a corresponding movement of rotor 17 if the valve plunger 15 is rotated to permit such movement.

By providing air bleeder valves or cocks 181 and 183, in motor chambers 165 and 163, the control valve and fluid motor may be filled with oil regardless of the relative positions of the piston 161 and rotor 17. To initially fill the valve and motor, or to add additional fluid thereto, all connections to the accumulator, tank and motor are made and the system is filled by alternately moving lever 33 to the right and left timing positions several strokes. If it is assumed that the rotor abutment 53 is to the left of its mid position when filling operations are started, then, when lever 33 is moved to the left until it reaches the left timing position, high pressure fluid will flow from the accumulator to the motor cylinder as has already been described. By keeping the air bleeder 181 of the chamber 165 open until a solid stream of fluid appears all air between the accumulator and the left-hand chamber 165 will be exhausted and replaced with fluid. Piston 161 will also be moved to its extreme right position forcing air from right-hand chamber 163 to the right-hand valve chamber 177. Inasmuch as air is compressible, the abutment 53 may or may not be moved to its extreme left stop position as a result of the air being forced into chamber 177. However, any movement of the abutment 53 to the left will force some of the air in the chamber 175 and the connecting fluid passages back into the supply tank. When lever 33 is now moved to the right timing position, fluid will flow to the right-hand motor chamber 163 in the manner previously described and, by opening the bleeder 183, all air between the right side of the piston 163 and the accumulator 3 will be exhausted and replaced by fluid. Piston 161 is, consequently, forced to the left until its stop position is reached and the fluid in chamber 165 and the lines and passages to chamber 175 is forced into the chamber filling it with a measure of fluid and air which tends to move to the right but, due to the compressibility of the air, the rotor 17 may or may not reach its right stop position. Whatever movement takes place forces some of the air out of the chamber 175 through the connecting passages back to the supply tank and it will be understood that after this first right and left cycle is completed the system is full of fluid except for the valve chambers 177 and 175 and connecting passages to the supply tank as they now contain a mixture of fluid and air. The second cycle of left and right movement of the lever 33 will force the air and fluid mixture out of the chambers 177 and 175, together with their connecting passages, back to the tank and the air and fluid mixture will be replaced by fluid alone. A third cycle of operation to the right and left will serve to put the various parts of the unit in timed relation if they are not already in this condition. If we now assume that abutment 53 of the rotor is to the right of its mid position, when lever 33 is moved to the left timing position, high pressure fluid from the accumulator will fill chamber 165 first and repeat the previously described conditions. Should the first movement of the lever 33 be to the right instead of to the left the system would be again filled with fluid in the manner previously described except that chamber 163 would be first filled due to the reversed flow of fluid from passage 85. Similarly, the timing operation may be started to the right position instead of the left position and the desired results accomplished.

I claim:

1. In a hydraulic control system for use with a source of high pressure liquid, in combination, a double-acting servo-motor having similar liquid displacement at the two ends thereof, a control valve element movable to selectively deliver high pressure liquid directly to either end of the motor, a double acting valve motor having two chambers, a second valve element associated for movement by said valve motor and providing a follow-up for the first valve element, means to deliver all of the liquid discharged from the inactive end of the servo-motor to that chamber of the valve motor which will cause movement of the follow-up valve element to close off flow to the servo-motor, and means to maintain said last mentioned chamber closed during said delivery whereby said follow-up is instantaneous.

2. A servo-motor control system for use with a source of liquid under pressure including in combination, a double-acting servo-motor having two alternatively filled and emptied chambers of like fluid capacity, a control valve having a first element movable to open position to selectively connect one of said chambers to said source, a second element cooperating with the first to provide follow-up to close said connection, a double acting valve motor connected to move said second element, said valve motor having two chambers adapted to be alternatively filled and emptied and means including said valve for connecting the discharging chamber of said servo-motor to the chamber of the valve motor which moves the follow-up element toward valve closing position, said means preventing discharge from the valve-motor chamber while it is filling to provide instantaneous follow-up.

3. A servo-motor control system for use with a source of liquid under pressure including in combination, a double-acting servo-motor having two alternatively filled and emptied chambers, a control valve having a first element movable to open position to selectively connect one of said chambers to said source, a second element cooperating with the first to provide follow-up to close said connection, a double-acting valve motor connected to move said second element, said valve motor having two chambers each at least as large in all corresponding displacements as the corresponding chamber of the servo-motor and adapted only to be alternatively filled and emptied and means including a portion of said valve for connecting the discharging chamber of said servo-motor to that chamber of the valve motor which moves the follow-up element toward valve closing position.

4. A servo-motor control system for use with a source of liquid under pressure including in combination, a double-acting servo-motor having two alternatively filled and emptied chambers, a control valve having a first element movable to open position to selectively connect one of said chambers to said source, a second element cooperating with the first to provide follow-up to close said connection, a double-acting valve motor connected to move said second element, said valve motor having two chambers each at least as large in all corresponding displacements as the corresponding chamber of the servo-motor and adapted to be alternatively filled and emptied, means including a portion of said valve for connecting the discharging chamber of said servo-motor to that chamber of the valve motor which moves the follow-up element toward valve closing position, and means in said valve to control the discharge from the other chamber of the valve motor while preventing discharge from the filling valve-motor chamber.

5. A servo-motor control system for use with a source of liquid under pressure including in combination, a servo-motor having a piston separating oppositely expandible chambers, a multiple control valve including a first element movable to selectively connect one of said chambers to said source, a second element cooperating with the first to provide follow-up, a valve motor connected to move said second element and having a piston separating oppositely expandible chambers, means including a portion of said valve for simultaneously connecting the discharging chamber of said servo-motor to that chamber of the valve motor which moves the follow-up element toward valve closing position and means to cause said follow-up to act in unison with the movement of the servo-piston.

6. A servo-motor control system for use with a source of liquid under pressure including in combination, a servo-motor having a piston separating oppositely expandible chambers, a multiple control valve including a first element movable to selectively connect one of said chambers to said source, a second element cooperating with the first to provide follow-up, a valve motor connected to move said second element and having a piston separating oppositely expandible chambers, means including a portion of said valve for simultaneously connecting that chamber of the valve motor which moves the follow-up element toward valve closing position to receive and hold the whole discharge from the inactive chamber of the servo-motor to provide synchronous follow-up.

7. A servo-motor control system for use with a source of liquid under pressure including in combination, a servo-motor having a piston separating alternatively expandible chambers, a control valve including a first element movable optionally through and beyond the distance necessary to connect either of said chambers to said source, a second element cooperating with the first to move through the selected distance to provide follow-up to close said connection, a valve motor connected to move said second element and having a piston separating alternatively expandible chambers each at least of the same maximum volume as the corresponding motor chamber, and means for connecting that chamber of the valve motor which moves the follow-up element toward valve closing position to receive and hold all of the liquid discharged from the inactive chamber of the servo-motor.

8. A servo-motor control system for use with a source of liquid under pressure including in combination, a servo-motor having a piston separating alternatively expandible chambers, a control valve including a first element movable optionally through and beyond the distance necessary to connect either of said chambers to said source, a second element cooperating with the first to move through the selected distance to provide follow-up to close said connection, a valve motor connected to move said second element and having a piston separating alternatively expandible chambers each at least of the same maximum volume as the corresponding motor chamber, means for connecting the discharging chamber of said servo-motor to that chamber of the valve motor which moves the follow-up element toward valve closing position each of said valve-motor chambers having but a single fluid passage, and means associated with the first valve element to designate the extent of movement of the servo-motor piston resulting from any particular setting of said element.

9. A servo-motor control system for use with a source of liquid under pressure including in combination, a double acting servo-motor having a piston separating two alternatively filled and emptied chambers, a control assembly including a valve having a central cylindrical element manually rotatable to open position to selectively connect one of said chambers to said source, a second valve element comprising a sleeve surrounding the first element and co-operating with the same to provide follow-up to close said connection, a double acting valve motor comprising a housing having abutments and a vane on said sleeve, said valve motor having two chambers between said vane and abutments adapted to be alternatively filled and emptied and means including ports forming part of said valve for connecting the discharging chamber of said servo-motor to the chamber of the valve motor which moves the follow-up element toward valve closing position.

10. A servo-motor control system for use with a source of liquid under pressure including in combination, a double acting servo-motor having a piston separating two alternatively filled and emptied chambers, a control assembly including a valve having a central cylindrical element manually rotatable to open position to selectively connect one of said chambers to said source, a second valve element comprising a sleeve surrounding the first element and cooperating with the same to provide follow-up to close said connection, a double acting valve motor comprising a housing having abutments and a vane on said sleeve, said valve motor having two chambers between said vane and abutments adapted to be alternatively filled and emptied, means including ports forming part of said valve for connecting the discharging chamber of said servo-motor to the chamber of the valve motor which moves the follow-up element toward valve closing position, means to limit the movement of the valve motor in each direction and a relief valve so incorporated in the system as to vent the emptying chamber of the servo-motor if the valve motor reaches its limit of movement first as a result of being not synchronized with the servo-motor, whereby synchronism is restored.

11. The system of claim 10 wherein the relief valve is a single valve in the central valve element so arranged as to always subject to the pressure tending to move the valve-motor.

12. A servo-motor control system for use with a source of liquid under pressure and a supply tank including in combination, a double acting servo-motor having two alternatively filled and emptied chambers, a control assembly including a valve having a central cylindrical element rotatable from normally closed to open position to selectively connect one of said chambers to said source, a second valve element comprising a sleeve surrounding the first element and cooperating with the same to provide follow-up to resume normal closed position, a double acting valve motor comprising an arcuate housing having abutments and a vane on said sleeve, said valve motor having two chambers between said vane and abutments adapted to be alternatively filled and emptied, means including ports forming part of said valve for connecting the discharging chamber of said servo-motor to the chamber of the valve motor which moves the follow-up element toward valve closing position and to connect the discharging chamber of the valve motor to said tank when the first valve element is moved from normal position.

13. Valve means for use with a servo-motor control system including in combination a multiple control valve having a manually movable element assembly and a fixed element, passages in said element and assembly adapted for alignment to conduct fluid, said members when in "off" position having lap to prevent leakage, a scale part, a pointer part to cooperate with said scale to indicate the actual amount of relative movement of said parts after said lap has been passed, means securing one of said parts to a stationary portion of the valve, and means providing a lost motion connection for the other part to said movable valve element, the amount of lost motion provided being just sufficient to compensate for said lap.

WILLIAM T. STEPHENS.